(12) United States Patent
Ju et al.

(10) Patent No.: US 12,066,130 B2
(45) Date of Patent: Aug. 20, 2024

(54) THREADED CONNECTION PARTIALLY IN A SELF-LOCKING ENGAGEMENT WITH AN EXTERNAL SHOULDER CAPABLE TO RESIST ELEVATED TORQUE

(71) Applicants: VALLOUREC OIL AND GAS FRANCE, Aulnoye-Aymeries (FR); NIPPON STEEL CORPORATION, Chiyoda-ku (JP)

(72) Inventors: Justin Ju, Boulogne-Billancourt (FR); Justin Perkins, Boulogne-Billancourt (FR); Eric Verger, Boulogne-Billancourt (FR)

(73) Assignees: VALLOUREC OIL AND GAS FRANCE, Aulnoye-Aymeries (FR); NIPPON STEEL CORPORATION, Chiyoda-ku (JP)

( * ) Notice: Subject to any disclaimer, the term of this patent is extended or adjusted under 35 U.S.C. 154(b) by 204 days.

(21) Appl. No.: 17/784,191

(22) PCT Filed: Dec. 10, 2020

(86) PCT No.: PCT/EP2020/085467
§ 371 (c)(1),
(2) Date: Jun. 10, 2022

(87) PCT Pub. No.: WO2021/116264
PCT Pub. Date: Jun. 7, 2021

(65) Prior Publication Data
US 2023/0027183 A1    Jan. 26, 2023

(30) Foreign Application Priority Data

Dec. 13, 2019    (EP) ..................................... 19215951

(51) Int. Cl.
F16L 15/06      (2006.01)
E21B 17/043     (2006.01)
F16L 15/00      (2006.01)

(52) U.S. Cl.
CPC ............ *F16L 15/06* (2013.01); *E21B 17/043* (2013.01); *F16L 15/004* (2013.01)

(58) Field of Classification Search
CPC ....... F16L 15/06; F16L 15/004; E21B 17/042; E21B 17/0423
See application file for complete search history.

(56) References Cited

U.S. PATENT DOCUMENTS 4,582,348 A * 4/1986 Dearden ................ F16L 15/004
                                                        411/413
4,796,923 A * 1/1989 Liggins ................. F16L 15/004
                                                        285/27

(Continued)

FOREIGN PATENT DOCUMENTS

EA        006187 B1    10/2005
EP    3 514 431 A1     7/2019

(Continued)

OTHER PUBLICATIONS

International Search Report issued Feb. 19, 2021 in PCT/EP2020/085467 filed on Dec. 10, 2020, 4 pages.

*Primary Examiner* — David Bochna
(74) *Attorney, Agent, or Firm* — Oblon, McClelland, Maier & Neustadt, L.L.P.

(57) ABSTRACT

Threaded joint, comprising a first and a second tubular component (C1, C2), the first tubular component comprising a first pipe body (10) and a male end (1), the male end comprising a distal surface (17) and a male threaded zone (13) at a male end, the second tubular component comprising a second pipe body (20) and a female end (2) comprising a distal surface and a female threaded zone (23), both male (Continued)

and female threaded zones (13, 23) comprising respectively a varying zone where thread have varying width, and a non varying zone, adjacent to the varying zone, where thread have a constant width, the varying zone of the male threaded zone being made up with the varying zone of the female threaded zone, and non varying zone of the male threaded zone being made up with the non varying zone of the female threaded zone, a thread profile of the male and female threaded zones being trapezoidal and a pin external shoulder (37) of the male end is in axial abutting contact against a corresponding abutment surface (42) of the female distal surface.

20 Claims, 4 Drawing Sheets

(56) References Cited

U.S. PATENT DOCUMENTS

| | | |
|---|---|---|
| 7,494,159 B2 | 2/2009 | Sugino et al. |
| 11,614,185 B2 | 3/2023 | Glukhih et al. |
| 2011/0278838 A1* | 11/2011 | Martin ................. E21B 17/042 |
| | | 285/333 |
| 2016/0024856 A1 | 1/2016 | Drenth |
| 2016/0161031 A1 | 6/2016 | Martin et al. |
| 2019/0203857 A1 | 7/2019 | Maruta et al. |
| 2020/0325734 A1* | 10/2020 | Langford ............. F16L 15/004 |
| 2022/0252188 A1* | 8/2022 | Oku ....................... F16L 15/06 |
| 2023/0146768 A1* | 5/2023 | Wada ..................... F16L 15/06 |
| | | 138/177 |
| 2023/0400126 A1* | 12/2023 | Ott ..................... E21B 17/0423 |
| 2023/0408000 A1* | 12/2023 | Owoeye ................ E21B 17/042 |

FOREIGN PATENT DOCUMENTS

| | | |
|---|---|---|
| EP | 3 514 432 A1 | 7/2019 |
| RU | 2 335 686 C1 | 10/2008 |
| RU | 2 443 931 C2 | 2/2012 |
| RU | 2 678 785 C1 | 2/2019 |
| WO | WO 03/076837 A2 | 9/2003 |
| WO | WO 2015/007579 A1 | 1/2015 |

* cited by examiner

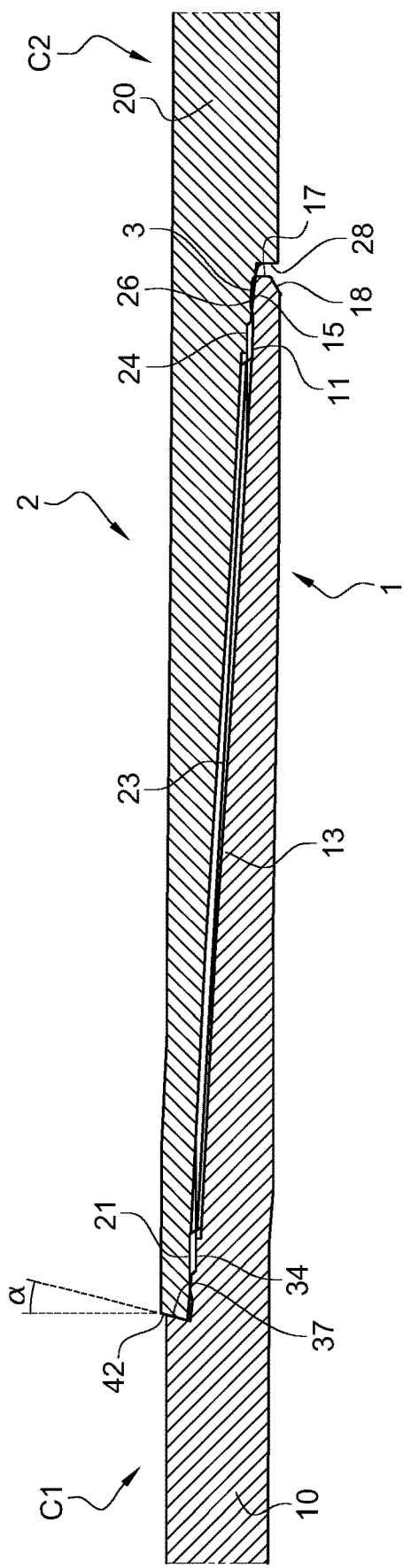

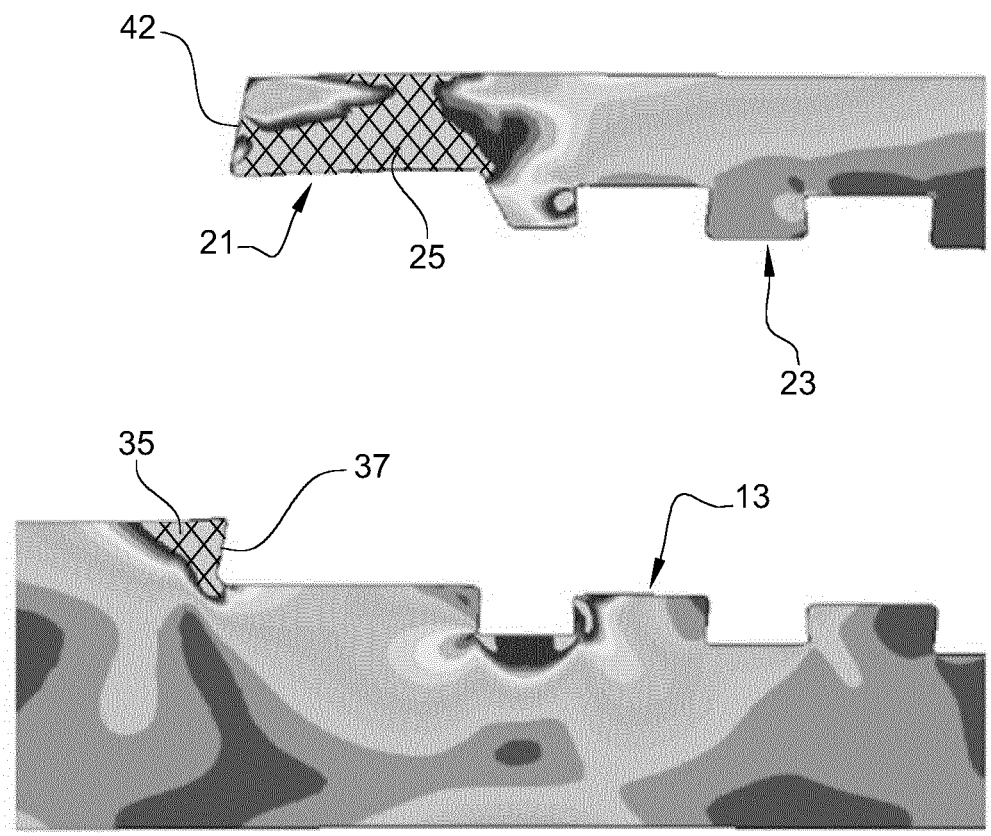

THREADED CONNECTION PARTIALLY IN A SELF-LOCKING ENGAGEMENT WITH AN EXTERNAL SHOULDER CAPABLE TO RESIST ELEVATED TORQUE

BACKGROUND OF THE INVENTION

The present invention relates to a threaded connection partially in a self-locking engagement with an external shoulder capable to resist elevated torque. The present invention design suits for development or exploration of wells, including deep water wells. The connection according to the invention is able to withstand elevated torques required for special applications such as drilling with casing, casing while drilling, rotating while cementing, or in highly deviated well to ease or account the drag when it is needed. According to the invention, elevated torque capacity refers to higher torque capacity than shouldered connection, for example above (30.000 ft·lb) 40.674 N·M for pipe bodies above 127 mm (5"). Applications will be particularly suited for connection needed to be rotated in the well without compromising sealability and structural resistance.

Casing joints, liners, and other oilfield tubulars are frequently used to drill, complete, and produce wells. For example, casing joints may be placed in a wellbore to stabilize and protect a formation against high wellbore pressures (e.g., wellbore pressures that exceed a formation pressure) that could otherwise damage the formation. Casing joints are sections of pipe (e.g., steel or titanium), which may be coupled in an end-to-end manner by threaded connections, or any other connection mechanisms known in the art. As such, connections are usually designed so that at least one seal is formed between an interior of the coupled casing joints and the annulus formed between exterior walls of the casing joints and the interior walls of the wellbore (i.e., the formation).

Typically, in a male-female threaded tubular connection, the male component of the connection is referred to as a "pin" member and the female component is called a "box" member. As used herein, "make-up" refers to engaging a pin member into a box member and threading the members together through torque and rotation. "make-up" refers to an assembly process of the joints to be held before lowering pipe string into a well. Usually a nominal make-up torque is set for a given connection. Nominal make-up torque corresponds to a value at which pin and box, assuming they were properly engaged, are enough inserted and energized one into the other to be lowered in a well and ensure the required performance.

Referring to the geometry of threads, the term "load flank" designates the side wall surface of a thread that faces away from the outer end of the respective pin or box member on which the thread is formed and supports the weight (i.e., tensile load) of the lower tubular member hanging in the well bore. Similarly, the term "stab flank" designates the side wall surface of the thread that faces toward the outer end of the respective pin or box member and supports forces compressing the joints toward each other during the initial make-up of the joint or such as a force applied to push a lower tubular member against the bottom of a bore hole (i.e., compressive force). The terms "root" and "crest" designate surfaces held between adjacent stab flank and load flank of a same thread, root being opposed to crest, and crests defining a most external surface of respective pin and box thread.

Trapezoidal threads comprise load flank, stab flank, root and crest, such that between two adjacent roots, load flank, stab flank and crest define a sensibly trapezoidal shape, where transitions between load flank and either root and crest may be curved, and the same for transitions between stab flank and either root and crest. Dovetail threads refer to trapezoidal thread profile wherein a first thread height location exists where an axial width, measured along a pipe longitudinal axis, of the thread at that first location is wider than an axial width of that same thread at a second thread height location, the second thread height location being closer to the root of that thread than the first thread height location. Dovetail profile prevent the connection from radial separation of male and female members, especially under traction compression cycles, with internal pressure loads.

As used herein, "varying threaded zone" are threads, regardless of a particular thread form, that increase in axial width (i.e., axial distance between load flanks and stab flanks measured along a longitudinal axis of the pipe) in opposite directions respectively on a pin member and a box member, so that complementary pin and box varying width threads move into engagement upon make-up of the connection. Varying width threads are usually in self-locking arrangement at the end of make up. Self-locking arrangement means that at the end of make up, no thread axial gap remains neither between respective load flanks of the pin member and a box member, nor between stab flanks of the pin member and a box member respectively.

The rate at which the threads change in width along the connection is defined by a variable known as a "varying width ratio". As used herein, "varying width ratio," although technically not a ratio, refers to the difference between the stab flank lead and the load flank lead, and describes how the opposing surfaces come together with every revolution of the thread. Furthermore, as used herein, a thread "lead" refers to the differential distance between a component of a thread on consecutive threads. As such, the "stab lead" is the distance between stab flanks of consecutive thread pitches along the axial length of the connection. The variance in thread width for a varying width thread occurs as a result of the load flanks having different leads than the stab flanks. A thread lead may be quantified in mm per revolution. Note that this is the inverse of a commonly used term "thread pitch," which is commonly quantified as threads per mm.

Varying width threads typically, for example as disclosed in U.S. Pat. Nos. 5,360,239 or 6,682,101, do not have positive-stop torque shoulders, so their make-up is "indeterminate." As a result, the relative position of the pin member and box member may vary more during selected make-up for a given torque range to be applied than for connections having a positive-stop torque shoulder. Thus for varying width threads having flank interference at a selected make-up, and no positive-stop torque shoulder, the nominal make-up torque is defined such that a selected amount of torque is obtained after torque resistance due to interference fit is observed by the operator on the make up chart.

Thus, a varying width thread may be able to thread-seal higher pressures of gas and/or liquid by designing the connection to have more flank interference and/or root/crest interference. However, increased interference may increase stress on the connection during selected make-up, which may lead to premature failure of the connection. Moreover, those varying width threads with the highest interference fit make-up even more indeterminately, a relative axial position of pin member and box member at the end of make up will vary over successive make-up and breakout cycles.

As previously mentioned, varying width threads typically do not include positive-stop torque shoulders because positive-stop torque shoulders reduce the amount of pipe thickness available for threads. Instead, the threads rely on a "wedge effect," or the varying width threads engaging stab and load flanks and allowing the varying width ratio to act as a "torque shoulder." Difficulties may still remain with varying width thread connections. However, since relative final positions of the box and pin members upon completion of a selected make-up of the varying width threads may vary from one make-up to another, this can cause a variation of contact stresses of the non-threaded features of the connection, i.e., the seals. Failure of seals may lead to a premature failure of the threaded connection.

Hence it is known from US-2011/278838 a varying width thread connection with an internal positive stop torque shoulder adjacent to an internal seal to improve the corresponding seal performance. A positive stop torque shoulder allows proper positioning of the sealing surfaces. Machining this thread connection requires small machining tolerances in order to achieve a proper balance of both seal and varying width thread to be adequately combined at the same time.

It is known from U.S. Pat. No. 9,273,521 another type of a varying width thread connection with an external positive stop torque shoulder adjacent to an external seal, but according to the teaching of that document, in order to reduce the risk of jump-out independently of the position of the thread, at a low make-up torque, an axial clearance between the stab flanks remain present after makeup. The connection is not in a self locking arrangement, and allows larger acceptable machining tolerances, thus threads cannot provide any seal feature, and sealability needs to be reached by the addition of seal features at both extremities of the threaded portion. In case of overtorquing situation, both external shoulder and seals would then yield, and performance would not be acceptable. U.S. Pat. No. 9,273,521 is not teaching a solution for elevated torque capability.

It is also known from US-2018-340378, another varying width thread connection with a positive stop torque shoulder provided by a specific design of a thread stop at the end of the threaded portion of both pin member and box member. The pin and box thread stops are configured to contact when pin and box varying width threads are fully engaged. According to that design, pin thread stop and box thread stop act like conventional positive-stop-torque shoulder and "protect" the connection in the event that the threaded connection is over-torqued, either during make-up or other downhole operations. In such a configuration, when the connection is over-torqued, the thread stops move into contact and can prevent additional relative rotational movement (and thread damage) of the threaded tubulars. US-2018-340378 teach to keep contact stresses between the thread stops below the yield limit of the material of the connection.

BRIEF SUMMARY OF THE INVENTION

There is a need for a connection with a proper balance between machining costs, high sealing performances with a precise relative seal position at the end of make up and the provision of a predictable make up procedure, in order to allow to withstand higher torque after make up, when inserted and or rotated in the borehole.

The invention proposes an improved connection in regards to low manufacturing costs and the above mentioned issues.

The invention concerns a threaded joint, comprising a first and a second tubular component, the first tubular component comprising a first pipe body and a male end, the male end comprising a distal surface and a threaded zone disposed on an external peripheral surface of the male end, the second tubular component comprising a second pipe body and a female end comprising a distal surface and a threaded zone disposed on an internal peripheral surface of the female end, both male and female threaded zones comprising respectively a varying zone where thread have varying width, and a non varying zone, adjacent to the varying zone, where thread have a constant width, the varying zone of the male threaded zone being made up with the varying zone of the female threaded zone, and non varying zone of the male threaded zone being made up with the non varying zone of the female threaded zone, a thread profile of the male and female threaded zones being trapezoidal and comprising load flank, stab flank, root and crest, wherein a pin external shoulder of the male end is in axial abutting contact against a corresponding abutment surface of the female distal surface, such pin external shoulder being held between first pipe body and the male threaded portion.

Preferably a thread axial gap between the male stab flank and the female stab flank in the non varying zone may be between 0.002 mm to 1 mm, preferably between 0.05 and 0.5 mm, even more preferably equal to 0.036 mm after make-up.

For example, a number of turns within the varying zone where the varying zones are made up in a self-locking arrangement, such that male stab flank are contacting female stab flank and male load flank are contacting female load flank may be comprised between 2 to 15, preferably between 2 to 12.

In a preferred embodiment of the invention, 5 to 50% of a number of turns within the female varying zone may comprise an imperfect height thread profile, wherein crests of the female imperfect thread in the varying zone are held on a cylindrical portion.

Similarly, in that same preferred embodiment, or in another embodiment, 10 to 30% of a total number of turns of the female threaded zone may comprise an imperfect height thread profile.

Preferably, varying and non varying zones may be adjacent on a same spiral. And even more preferably, both male and female threaded zones are each made of a single spiral.

In a preferred embodiment, 0 to 50% of a number of turns within the male non varying zone may comprise an imperfect height thread profile, wherein crests of the male imperfect thread in the non varying zone are held on a cylindrical portion.

The trapezoidal thread profile of the male and female threaded zones may preferably be dovetail in order to avoid jump-out under high internal pressure conditions. To that end, the trapezoidal thread profile of the male and female threaded zones may comprise load and or stab flanks including "negative" angles over at least a portion of a radial dimension of the corresponding flanks. Load flank and stab flank of the male and female threaded zones may define a negative angle with a plane perpendicular to a longitudinal axis of the first component, such negative angle being in a range of 1° to 15°, preferably 3° to 7°, for example equal to 5°.

For example, a radial clearance may subsist after make-up between crests of the male threads and roots of the female threads, for example a radial clearance between 0.05 mm to 0.5 mm, preferably 0.05 to 0.15 mm, for example equal to 0.1 mm.

Pin external shoulder may also define a reverse angle between 1° and 45°, preferably between 5° to 20°, for example equal to 15°. Such configuration better resist to compression.

The male distal surface may remain at non zero distance of any corresponding internal surface of the female end after make-up.

Preferably, the threaded connection may comprise a metal to metal seal of the tore to cone type, preferably where tore is on the male end and cone on female end, such metal to metal seal being opposite to the pin external shoulder, and located between the male threaded zone and the male distal surface. Thus the metal to metal seal is located away from the shoulder that may yield. In order to further protect the metal to metal seal, a cylindrical groove may be provided between the male threaded portion and the metal to metal seal portion.

According to a preferred embodiment of the invention, threaded zones are tapered, with a taper in a range of 4% to 15%, preferably of ¹⁄₁₄.

The invention also aims to the use of a threaded joint according to the invention as casing or liner, wherein outer diameter of pipe body is selected above 177.8 mm (7 inch), preferably above 244.5 mm (9⅝ inch), and even preferably above 406.4 mm (16"), threaded joints of those casing and liner being "semi flush".

In conjunction with the threaded joint of the invention, the invention also aims to define a make up method of that threaded joint wherein abutting the pin external shoulder with a corresponding abutment surface of the female end occurs before a thread axial gap between the male stab flank and the female stab flank in the varying zone equals zero. Such method may be defined such that, at the end of make up, pin external shoulder abuts the corresponding abutment surface of the female end, and a thread axial gap between stab flanks in the varying zone remains superior or equal to 0. Alternatively or in addition, at the end of make up, a thread axial gap between stab flanks in the varying zone may remain inferior to a thread axial gap between stab flank in the non varying zone.

BRIEF DESCRIPTION OF THE DRAWINGS

Further characteristics and advantages of the invention will become apparent from the following detailed description and drawings in which:

FIG. 1 diagrammatically shows a threaded zone of the connection according to the invention in a longitudinal sectional half-view;

FIGS. 5a and 5b shows, in a longitudinal sectional half-view, a detail of the variation of the strain observed at the end of make up in a connection according to the invention based on elasto-plastic finite element analysis for the female end and the male end respectively, between an external shoulder and their threaded zones;

DETAILED DESCRIPTION OF THE INVENTION

Figure 2A:
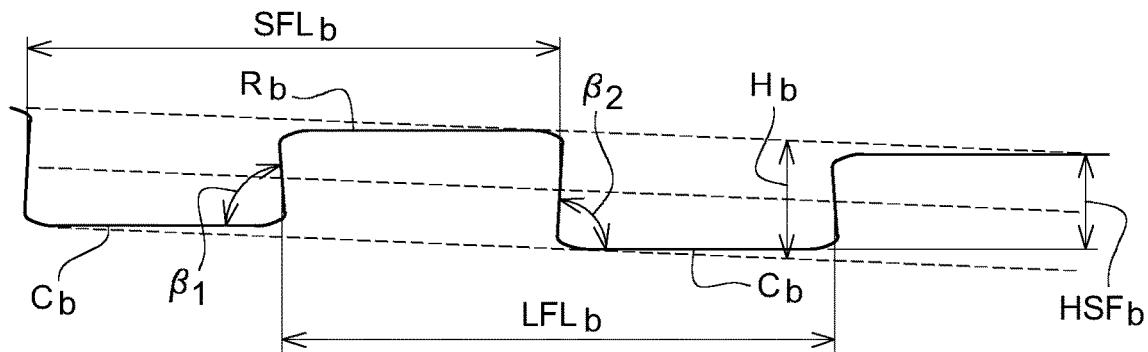
FIGS. 2a and 2b are detailed longitudinal sectional views of a trapezoidal thread profile of the female and respectively male threaded zones of a connection according to the invention.

The accompanying drawings will not only serve to complete the invention but also, if necessary, to contribute to its definition. As is the case with all of the drawings in longitudinal sectional half-view of the present application, the representations illustrate half planes, because both half planes along a longitudinal sectional view, are substantial symmetrical with respect to the axis of the tube and the connection.

FIG. 1 represents a connection in accordance with the invention formed by makeup of a first tubular component C1 having a male end 1 with a second tubular component C2 provided with a female end 2. The connection comprises an internal seal 3.

The tubular components C1 and C2 each comprise a pipe body, respectively 10 and 20. The female end and the male end intended to form the connection in accordance with the invention are disposed at the ends of such tubes. The male end 1 is disposed at one end of the first pipe body 10. The female end 2 is disposed at one end of the second pipe body 20. The pipe bodies 10 and 20 may be several metres in length, for example of the Range 3 type of 10 to 15 meters in length. Preferably pipe bodies 10 and 20 have the same nominal outer diameter and the same nominal pipe width. A great length tube may be provided with a male end at one end and with a female threaded element at an opposite end. However, the invention may nevertheless also be applied to a connection employing a coupling comprising a short tube provided with female ends at both of its ends.

The connection in accordance with the invention may be used to constitute casing strings or tubing strings for hydrocarbon wells, work-over risers or drill pipe strings for the same wells.

The tubes are preferably formed from steel. For example, grade of the steel material is between 80 ksi (550 MPa) and 140 ksi (965 MPa). For example, steel grade is above 100 ksi (690 MPa), for example 125 ksi (860 MPa). In fact, they may be produced from different grades of non-alloyed, low alloy or high alloy steel, or even from ferrous or non-ferrous alloy, heat treated or work hardened depending on the service conditions such as, for example: level of mechanical load, corrosive nature of the fluid inside or outside the tubes, etc. It is also possible to use steel tubes that have low corrosion resistance covered with a protective coating, for example a coating of a corrosion-resistant alloy or a synthetic material.

In FIG. 1, the male end 1 comprises a male threaded zone 13 disposed on an external peripheral surface of said male end 1, and the female end 2 comprises a female threaded zone 23 on an internal peripheral surface of the female end. According to that embodiment, both male and female threaded zones 13 and 23 are tapered substantially with a same taper, for example with a taper in the range 4% to 15%, preferably about ¹⁄₁₄.

In order to make up such threaded zones 13 and 23 together, the use of thread dope or a dope free coating already applied on at least one of the threaded zones is preferable.

An inner male lip 11 is provided between the male threaded zone 13 and a free distal end 17 of the male end 1. The free distal surface 17 extends substantially radially relative to the longitudinal axis of the component C1. At the end of make up, the male distal surface 17 is free of any contact with the female end 2. The female end 2 comprises a female inner recess 24 facing the male inner lip 11. This female inner recess comprises an internal shoulder 28 at non zero distance from the male distal surface 17.

The female inner recess also comprises a tapered female internal sealing surface 26 with a diameter that decreases towards the internal abutment 28 with a cone half-angle in the range 2° to 15°. This sealing surface 26 is capable of coming into interfering contact with a corresponding male internal sealing surface 15 provided on the inner male lip 11. The female internal sealing surface 26 may have the same taper as that of the male internal sealing surface 15. The male internal sealing surface 15 may be toroidal with a convex radius in the range 10 to 80 mm.

Furthermore, the male end 1 comprises a male outer recess 34 on its external periphery beyond the male threaded zone 13 in the direction of the pipe body 10. The male outer recess comprises a cylindrical surface 34 immediately adjacent to the male threaded zone 13, such cylindrical surface 34 extending up to an external abutment surface 37, also termed pin external shoulder 37. The female end 2 further comprises an outer female lip 21 on its internal periphery beyond the threaded zone 23 in the direction of its free distal surface 42. Said outer female lip 21 is cylindrical and facing at non zero distance the corresponding male outer recess cylindrical surface 34.

At the end of make up, the female distal surface 42 forms an abutment surface that abuts with the corresponding male external abutment surface 37 in order to provide the connection with an external shoulder. The external abutment surface 37 has a positive angle α with respect to the perpendicular to the longitudinal axis of the connection. The positive angle is orientated in the trigonometric sense, i.e. in the clockwise direction. Both the external abutment surface 37 and the female distal surface 42 are preferably presenting a same angle. Alternatively, the female distal surface may be slightly mismatched with positive angle α. The positive angle α is in the range 1° to 45°, preferably between 5° to 20°, and in the disclosed embodiment equals to 15°.

Figure 2B:
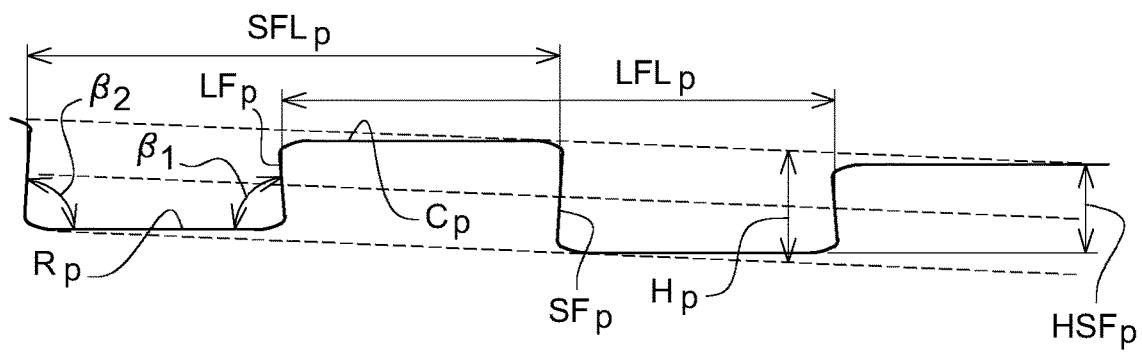

The threaded zone 13 and 23 comprises trapezoidal thread with a thread teeth profile comprising load flank LF, stab flank SF, root R and crest C. Male trapezoidal thread teeth comprises load flank LFp, stab flank SFp, root Rp and crest Cp. Female trapezoidal thread teeth comprises load flank LFb, stab flank SFb, root Rb and crest Cb. According to one embodiment according to the invention, FIGS. 2a and 2b, those threaded zones comprises teeth with a dovetail profile, such that root Rp and Rb and crest Cp and Cb are parallel to the longitudinal axis X of the pipe bodies 10 and 20, and an angle β1 between the load flank FPp or FPb and adjacent root Rp and Rb correspondingly, and respectively an angle β2 between the stab flank SFp and the adjacent root Rp are and Rb correspondingly both inferior to 90°, preferably inferior or equal to 85°. Preferably angles β1 and β2 are equal.

Trapezoidal thread profile being dovetail, thus crest width is larger than a width of that teeth at a location defined between that crest and adjacent roots. Preferably, as represented, male teeth height Hp are radially smaller than female teeth height Hb such that a radial gap is defined between male crest Cp and female root Rp. As the threaded zones 13 and 23 are tapered, a radial height Hsfp of the male load flank LFp is inferior to Hp, and respectively, a radial height Hsfb of the female load flank LFb is inferior to Hb, while Hsfp is smaller than Hsfb. This radial gap defines an helical path for the dope at the time of make up. Crests and roots being parallel to a same longitudinal axis, the radial gap may have a constant radial height all along the path, for example that height being 0.1 mm.

Figure 3:
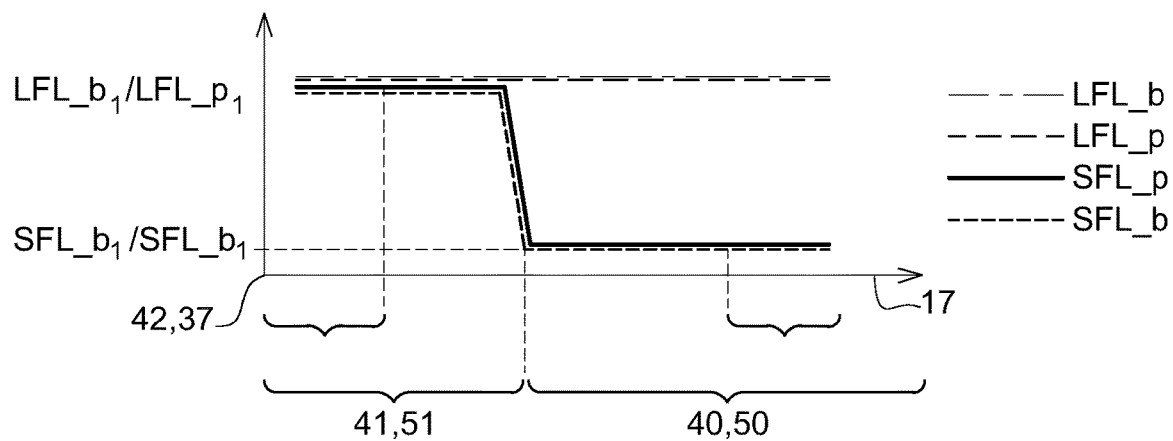
FIG. 3 is a graph showing the evolution of the leads between the load flanks and the stab flanks along the threads of the male and female member in accordance with FIG. 1 as a function of the distance from the distal surface of the male end.

Each threaded zone 13 and 23 comprise a varying zone 40, 50, or wedge zone, and a non varying zone 41, 51. FIG. 3 is a graph according to different embodiments of the invention showing the evolution of the leads between the load flanks and the stab flanks for respectively the male threaded zone and female threaded zone in accordance with FIG. 1 as a function of the distance from the distal surface 17 of the male end 1, when the connection is made up. Graph of FIG. 3 represents lead values of respectively male stab flanks (SFP_p), male load flanks (LFP_p), female stab flanks (SFP_b), and female load flanks (LFP_b) along y-axis, with x-axis representing the location of the thread along a longitudinal axis of the tubular component, between female distal abutment surface 42 and the male distal surface 17 when the connection is made-up.

More precisely, FIG. 3, the male threaded zone 13 comprise a first portion 40 wherein the lead SFL_p between the male stab flanks is constant at a value SFL_p1, and the lead LFL_p between the male load flanks is also constant but at a different value LFL_p1. In the example of FIG. 1, LFL_p1 is strictly superior to SFL_p1. For example, in one embodiment of the invention:

LFL_p1=8.466 mm
SFL_p1=8.066 mm

In a second non varying portion 41 the male threaded zone 13, the lead SFL_p is constant at that same value SFP_p1, and the lead LFL_p is also constant and now equals SFL_p.

Thus a varying width ratio of the first portion 50, which is the difference between the load flank lead and the stab flank lead here equals 0.4 mm.

FIG. 3, the female threaded zone 23 comprise a first portion 50 wherein the lead SFL_b between the female stab flanks is constant at a value SFL_b1, and the lead LFL_b between the female load flanks is also constant but at a different value LFL_b1. In the example of FIG. 1, LFL_b1 is strictly superior to SFL_b1. For example, in one embodiment of the invention:

LFL_p1=LFL_b1 and
SFL_p1=SFL_b1

In a second portion 51 the female threaded zone 23, the lead SFL_b is constant at that same value SFL_b1, and the lead LFL_b is also constant and now equals SFL_b. Within the scope of the invention, other stab flank lead and load flank lead values are acceptable.

Thus varying width ratio of the first portions 50 and 51 are identical. Moreover, the male and female threaded zones 13 and 23 are constructed such that male varying zone 40 overlaps female varying zone 50, and male non varying zone 41 overlaps female non varying zone 51.

Make up of the connection according to the invention is made such that axial movement of the male end 1 into the female end 2 stops when external shoulder abuts. Thus relative position of the change between varying and non varying zones are determinate. Hence, change in stab flanks leads for both male and female threaded zone occurs within a same turn, preferably within the same half turn. Threaded zones 13 and 23 may be single start. Each threaded zone may have a unique single threaded spire. A unique threaded spire means a spire with no interruption. Thus varying and non varying zones are adjacent on a same spiral. Stab flanks angle β2 and load flank β1 angle remain the same in both the varying zones 40, 50 and the non varying zone 41, 51.

When the teeth of the non varying zones 41 and 51 are made up together, a thread axial gap TAG is defined between stab flanks of the non varying zones 41 and 51, as those thread with a constant width are not made up in a self locking arrangement. TAG is for example above 0.3 mm.

When abutting the pin external shoulder 37 with the corresponding abutment surface 42, a thread axial gap between load flanks and stab flanks in the varying zone may be positive or equal to zero. At the end of make up, when positive, such thread axial gap between stab flanks in the varying zone 40, 50 remains inferior to the TAG.

Figure 6:
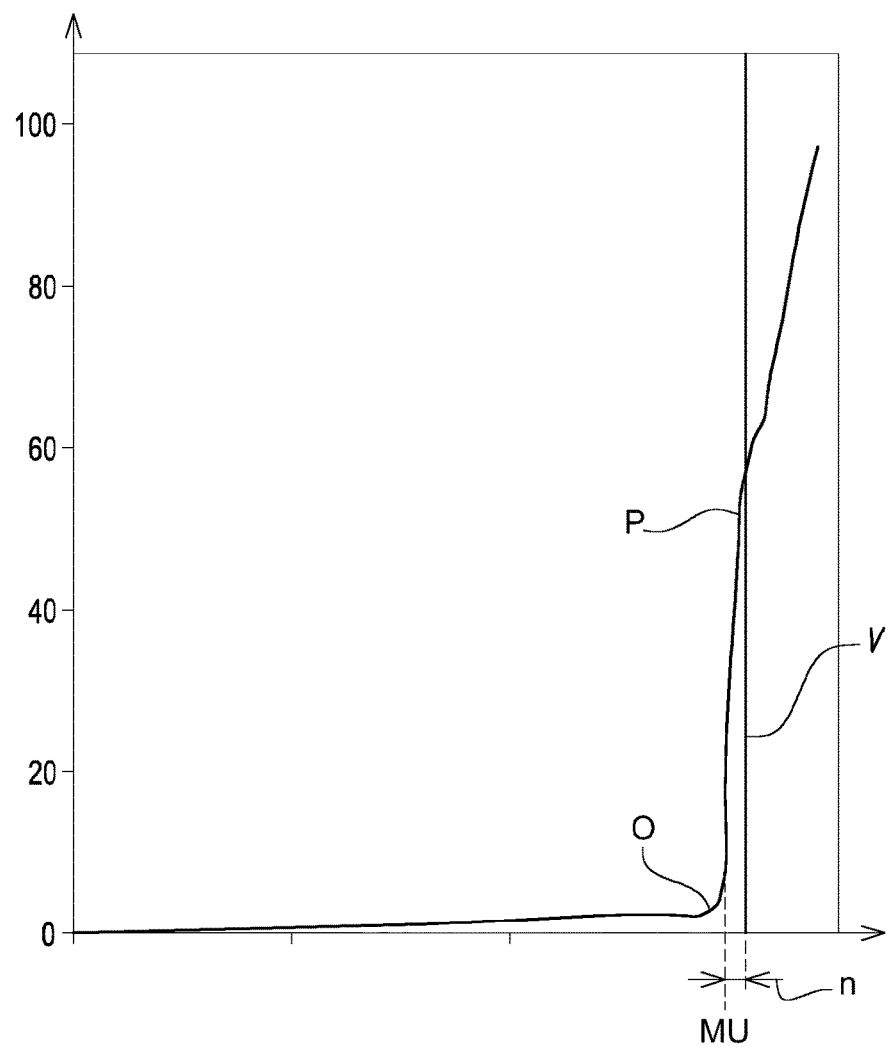
FIG. 6 shows a torque make up curve of a connection according to the invention.

Thus after make up, when the connection is lowered and rotated into the borehole, extra torque may be applied, and such additional torque on shoulder will bring at least the male external abutment surface 37 to yield, but then locking threads of the varying zone 40 and 50 will enter into contact and undergo that level of torque, with no impact on sealability as the seal design allow for that slight axial movement of the seal surfaces. FIGS. 5a and 5b represent yielding area within the external shoulder 37 and the corresponding abutment surface 42 when an overtorque V according to FIG. 6 is applied to the made up connection. A dashed through wall zone 25 fully yielded is represented through the outer female lip 21 on FIG. 6a, under that overtorque. The outer female lip 21 is unstable under those overtorque condition. A dashed 45° angled zone 35 is defined beside the external shoulder 37, over a full height of that external shoulder 37. The zone 35 is fully yielded and there will be no more progress in the yielding condition of the external abutment shoulder, if additional torque is applied beyond the V level identified on FIG. 6. As seen on FIGS. 5a and 5b, at that V level, threads are not yielded at all.

FIG. 6, represent torque capacity in y-axis of the connection depending of a relative number of turns of the pin member into the box member along the x-axis. As can be seen, before make up MU, pin and box member rotates relative to each other with a very low torque slope, as the torque resistance comes from the seal and or radial interference of the threads if any. When the external shoulder starts to contact at point O, there is a strong increase in the slope of the chart, but a thread axial gap between the male stab flank and the female stab flank in the varying zone is still above zero, as the thread in the varying zone are not yet in a self locking arrangement.

From point O to a point P, the slope is linear. Between O and P, a maximum of 0.2% of plastic strain is reached in the inner male lip 11.

End of make up according to rig requirement MU, or nominal make up torque MU, is selected between O and P. From O to P, relative motion of pin and box members in term of number of turn "n" is very low, for example below 0.4 turn. Due to the rigidity of the external shoulder, pin and box are almost no more rotating relative to each other.

According to one embodiment of the invention, the nominal make up MU is selected such that a thread axial gap between stab flanks in the varying zone remains superior to 0. According to an alternative embodiment of the invention, the nominal make up is selected such that a thread axial gap between stab flanks in the varying zone is no more existing, and thus equals 0, whereas a thread axial gap between stab flanks in the non varying zone remains strictly superior to 0.

After point P, the curve slightly deflects as the shoulder are yielded. After MU, and even more, after point P; threads of the varying zone start absorbing torque capacity. The thread axial gap between the male stab flank and the female stab flank in the varying zone is starting to be progressively closed and or contact pressure between stab flanks to increase. Deflection in the curve of the torque capacity after MU, and even more after point P is a signature of a connection according to the invention.

Seal 3 is a metal-to-metal seal, with an interfering seal length, wherein before make up outer diameter of the male sealing surface 16 is above the inner diameter of the female sealing surface 24 along a given distance, approximately representing the seal length.

Figure 4:
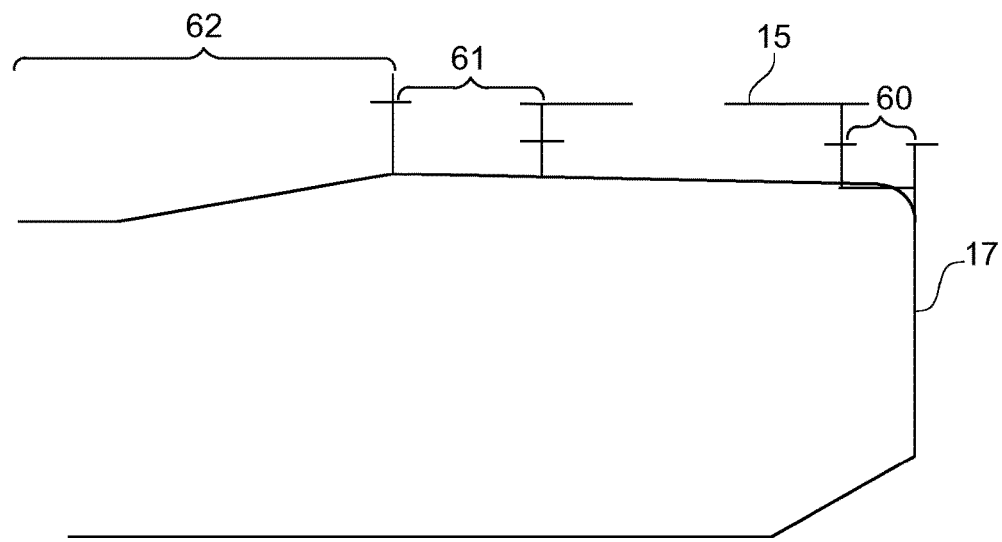
FIG. 4 diagrammatically shows, in a longitudinal sectional half-view, a detail of the male end, between a threaded zone and a distal surface of the male end.

As evidenced on FIG. 4, male sealing surface 16 is a radiused surface of a large radius of curvature, placed in between a tapered portion 60 radiusly linked to the male distal surface 17 on one side, and a cylindrical portion 61 on the other side. A groove 62 is defined on the male inner lip 11, such that the groove 62 is located between the male varying threaded zone 40 and the cylindrical portion 61.

The female varying threaded zone 50 starts with imperfect thread adjacent to the female inner recess 24 facing that groove 62. Imperfect thread are so called as the thread height is below Hb, as the female crest Cb in that specific location of imperfect threads are aligned with a same cylindrical surface. Female imperfect threads represent less than half of the thread turns of the varying zone 50. Female imperfect threads represent less than 30% of the total number of thread turn of the female threaded zone 23. Female imperfect threads are exclusively held in the varying zone.

The male non varying threaded zone 51 starts with imperfect thread adjacent to the male cylindrical surface 34. Imperfect thread are so called as the thread height is below Hp, as the male crest Cp in that specific location of imperfect threads are aligned in the same surface as the cylindrical surface 34. Male imperfect threads represent less than half of the thread turns of the non varying zone 51. Male imperfect threads represent less than 30% of the total number of thread turn of the male threaded zone 13. Male imperfect threads are exclusively held in the non varying zone 51.

The number of thread turn in self locking arrangement in the varying zone is set between 2 and 12, the highest number of turns being for the largest pipe body OD size. For example, for OD of 558.8 mm (22"), then the number of thread turn of the varying zone is about 12, whereas for OD of 431.8 mm (17"), then the number of thread turn of the varying zone is about 9.

The invention claimed is:
1. A threaded joint, comprising:
a first tubular component, the first tubular component comprising a first pipe body and a male end, the male end comprising a distal surface and a threaded zone disposed on an external peripheral surface of the male end; and
a second tubular component comprising a second pipe body and a female end comprising a distal surface and a threaded zone disposed on an internal peripheral surface of the female end,
wherein both male and female threaded zones include respectively a varying zone where thread have varying width, and a non varying zone, adjacent to the varying zone, where thread have a constant width,
wherein the varying zone of the male threaded zone is made up with the varying zone of the female threaded zone, and the non varying zone of the male threaded zone is made up with the non varying zone of the female threaded zone,
wherein a thread profile of the male and female threaded zones are trapezoidal and include a load flank, a stab flank, a root and a crest,
wherein a pin external shoulder of the male end is in axial abutting contact against a corresponding abutment surface of the female distal surface, such pin external shoulder being held between first pipe body and the male threaded portion, and wherein a thread axial gap between the male stab flank and the female stab flank in the non varying zone is between 0.002 mm to 1 mm.

2. The threaded joint according to claim 1, wherein a number of thread turns within the varying zone where the varying zones are made up in a self-locking arrangement, such that male stab flanks are contacting female stab flanks and male load flanks are contacting female load flanks is comprised between 2 to 15.

3. The threaded joint according to claim 1, wherein 5 to 50% of a number of thread turns within the female varying zone comprises an imperfect height thread profile, wherein crests of the female imperfect thread in the varying zone are held on a cylindrical surface.

4. The threaded joint according to claim 1, wherein 10 to 30% of a total number of thread turns of the female threaded zone comprises an imperfect height thread profile.

5. The threaded joint according to claim 1, wherein varying and non varying zones are adjacent on a same spiral.

6. The threaded joint according to claim 1, wherein both the male and female threaded zones are each made of a single spiral.

7. The threaded joint according to claim 1, wherein 0 to 50% of a number of thread turns within the male non varying zone comprises an imperfect height thread profile, wherein crests of the male imperfect thread in the non varying zone are held on a cylindrical surface.

8. The threaded joint according to claim 1, wherein the trapezoidal thread profile of the male and female threaded zones is dovetail.

9. The threaded joint according to claim 1, wherein the trapezoidal thread profile of the male and female threaded zones comprises load and or stab flanks including "negative" angles over at least a portion of a radial dimension of the corresponding flanks.

10. The threaded joint according to claim 1, wherein load flank and stab flank of the male and female threaded zones is defining a negative angle with a plane perpendicular to a longitudinal axis of the first component, such negative angle being in a range of 1° to 15°.

11. The threaded joint according to claim 1, wherein a radial clearance subsists after make-up between crests of the male threads and roots of the female threads, for example a radial clearance between 0.05 mm to 0.5 mm.

12. The threaded joint according to claim 1, wherein pin external shoulder defines a reverse angle between 1° and 45°.

13. The threaded joint according to claim 1, wherein a male distal surface remains at non zero distance of any corresponding internal surface of the female end after make-up.

14. The threaded joint according to claim 1, wherein the threaded joint includes a metal to metal seal of the tore to cone type where tore is on the male end and cone on female end, such metal to metal seal being opposite to the pin external shoulder, and located between the male threaded zone and the male distal surface.

15. The threaded joint according to claim 14, wherein the male end comprises a cylindrical groove between the male threaded portion and the metal to metal seal portion.

16. The threaded joint according to claim 1, wherein threaded zones are tapered, with a taper in a range of 4% to 15%.

17. Use of a threaded joint according to claim 1, for casing or liner, wherein outer diameter of pipe body is selected above 177.8 mm (7 inch).

18. Method of make up of a threaded joint according to claim 1, wherein abutting the pin external shoulder with a corresponding abutment surface of the female end occurs before a thread axial gap between the male stab flank and the female stab flank in the varying zone equals zero.

19. Method of make up a threaded joint according claim 18, wherein at the end of make up, pin external shoulder abuts the corresponding abutment surface of the female end, and a thread axial gap between stab flanks in the varying zone remains greater than 0.

20. Method of make up a threaded joint according to claim 19, wherein at the end of make up, a thread axial gap between stab flanks in the varying zone remains less than a thread axial gap between stab flank in the non varying zone.

* * * * *